United States Patent [19]

Takano et al.

[11] Patent Number: 4,484,672
[45] Date of Patent: Nov. 27, 1984

[54] SYSTEM FOR CONTROLLING AN ELECTRO-MAGNETIC CLUTCH FOR AUTOMOBILES

[75] Inventors: Toshio Takano; Ryuzo Sakakiyama, both of Tokyo, Japan

[73] Assignee: Fuji Jukogyo Kabushiki Kaisha, Tokyo, Japan

[21] Appl. No.: 263,319

[22] Filed: May 11, 1981

[30] Foreign Application Priority Data

Jul. 28, 1980 [JP] Japan .............................. 55-103326
Aug. 9, 1980 [JP] Japan .............................. 55-109645

[51] Int. Cl.³ ............................................. B60K 41/22
[52] U.S. Cl. .................................. 192/3.56; 192/21.5
[58] Field of Search ................. 192/3.58, 3.56, 21.5, 192/0.08, 84 A, 103 R, 0.075, 0.076, 0.08

[56] References Cited

U.S. PATENT DOCUMENTS

| | | | |
|---|---|---|---|
| 2,688,388 | 9/1959 | Gill | 192/21.5 |
| 3,730,317 | 5/1973 | Jaeschke | 192/84 A |
| 3,752,284 | 8/1973 | Brittain et al. | 192/3.58 |
| 4,086,994 | 5/1978 | Hirosawa et al. | 192/0.075 |

FOREIGN PATENT DOCUMENTS

| | | |
|---|---|---|
| GB809490 | 2/1959 | United Kingdom . |
| GB860545 | 2/1961 | United Kingdom . |
| GB955602 | 4/1964 | United Kingdom . |
| GB993632 | 6/1965 | United Kingdom . |
| 2080910 | 1/1982 | United Kingdom ............ 192/103 R |

Primary Examiner—George H. Krizmanich
Assistant Examiner—M. Manley
Attorney, Agent, or Firm—Martin A. Farber

[57] ABSTRACT

A system for controlling an electro-magnetic clutch of an internal combustion engine mounted on a vehicle, which is capable of eliminating residual magnetism during operation of a shift lever of a transmission. The electro-magnetic clutch has a drive member secured to a crankshaft of the internal combustion engine, a magnetizing coil provided in the drive member and a driven member adjacent said drive member. A neutral switch is provided for detecting when the shift lever is in a neutral position and a shift lever switch is provided for producing a signal during operation of the shift lever for the transmission. Both signals of the neutral switch and the shift lever switch are fed to a control circuit. The control circuit is so arranged that the current flowing through the magnetizing coil is inverted in dependency on the output signals of the neutral switch and shift lever switch, so that the residual magnetism in the clutch may be eliminated.

12 Claims, 6 Drawing Figures

SYSTEM FOR CONTROLLING AN ELECTRO-MAGNETIC CLUTCH FOR AUTOMOBILES

BACKGROUND OF THE INVENTION

The present invention relates to a system for controlling an electro-magnetic clutch for automobiles, and more particularly to a system for controlling an electro-magnetic powder clutch which is capable of eliminating residual magnetism.

An electro-magnetic powder clutch comprises an annular drive member secured to the crankshaft of the engine, a magnetizing coil provided in the drive member, a driven member secured to the input shaft of the transmission spaced by a gap from the drive member, powder provided in the clutch, and a shift lever for changing gears in the transmission. The shift lever is provided with a switch for the magnetizing coil, which is actuated by operating the shift lever. When the shift lever is shifted to a gear engaging position, the switch is closed so that electric current flows through the magnetizing coil to magnetize the drive member. As the accelerator pedal is depressed, the current applied to the coil increases. The powder in the clutch is aggregated in the gap by the magnetic flux, so that the driven member is coupled to the drive member through the powder. Thus, the output of the engine may be transmitted to the transmission. In such an electromagnetic clutch, in order to achieve smooth engagement between gears in the transmission, the system is adapted to cause the clutch to actuate a so-called double-clutch action. That is, the switch is so arranged that it is closed for magnetizing the coil when the shift lever is in the neutral position, and it is opened when a manual operating force is applied to the shift lever for changing speed. Thus, the clutch is engaged in the neutral position and is disengaged during the operation of the shift lever, and is engaged again when the shift lever reaches the gear engaging position.

In such a system, when the shift lever is shifted from one change speed position to another change speed position passing through the neutral position, residual magnetism then occurs in the clutch. The shift lever then must be operated against the drag torque caused by the residual magnetism, which requires a great manual operating force. This tendency increases when the engine speed is increased at idling. In a transmission without a synchronizing mechanism, when the gear-change is quickly performed, gears do not smoothly engage each other, because it takes a long time until the gears are synchronized.

SUMMARY OF THE INVENTION

According to the invention there is provided a system for controlling an electro-magnetic clutch of an internal combustion engine mounted on a vehicle, which has a drive member secured to a crankshaft of said internal combustion engine, a driven member adjacent said drive member, a transmission secured to said driven member and having multi-stage change gears and a shift lever therefor, a magnetizing coil provided in one of said members, and an electric circuit means including said magnetizing coil which is capable of passing excitation current through said magnetizing coil in a normal direction, the improvement comprising shift lever switch means in a first condition thereof for producing an output signal having one logic level during operation of the shift lever of said transmission, said shift lever switch means having a second condition for producing an output signal having another logic level when the shift lever of said transmission is not operated, a neutral switch means for producing an output signal having one logic level in a neutral position of the shift lever, a car speed detecting means for producing one output signal when the vehicle speed is in a low speed range lower than said predetermined speed and another output signal when the vehicle speed is in a high speed range higher than said predetermined speed, and logic circuit means responsive to said output signals of said shift lever switch means, said neutral switch means, and said car speed detecting means for providing an output signal having logic levels, said electric circuit means being responsive to said output signal of said logic circuit means for controlling the current flowing through said magnetizing coil, said electric circuit means being so arranged that the current flows through said magnetizing coil with inverted polarity when the output signal from said logic circuit means has one logic level in the neutral position of said shift lever when said one output signal of said car speed detecting means occurs in said low speed range, and respectively during operation of said shift lever, respectively that the excitation current flows through said magnetizing coil in said normal direction when the output signal of said logic circuit means has another logic level in response to the second condition of said shift lever switch means in the neutral position of said shift lever when the vehicle speed is greater than said predetermined speed for causing a double clutch operation.

Other objects and features of the present invention will be more apparent from the following description with reference to the accompanying drawings of preferred embodiment examples of the invention.

DETAILED DESCRIPTION OF THE PREFERRED EMBODIMENTS

Figure 1:
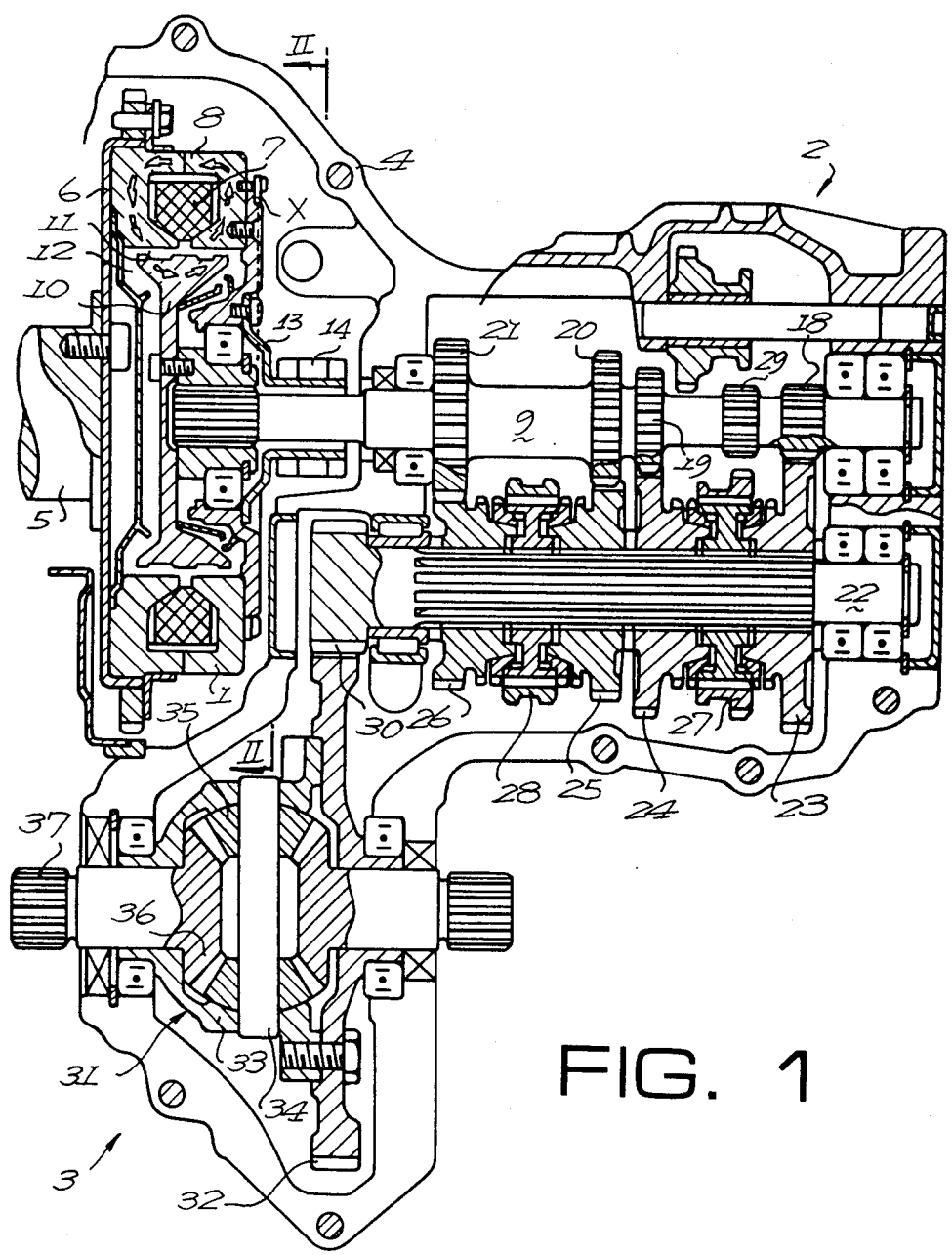
FIG. 1 is a sectional view of a transmission with an electromagnetic clutch used in a system according to the present invention.
Figure 2:
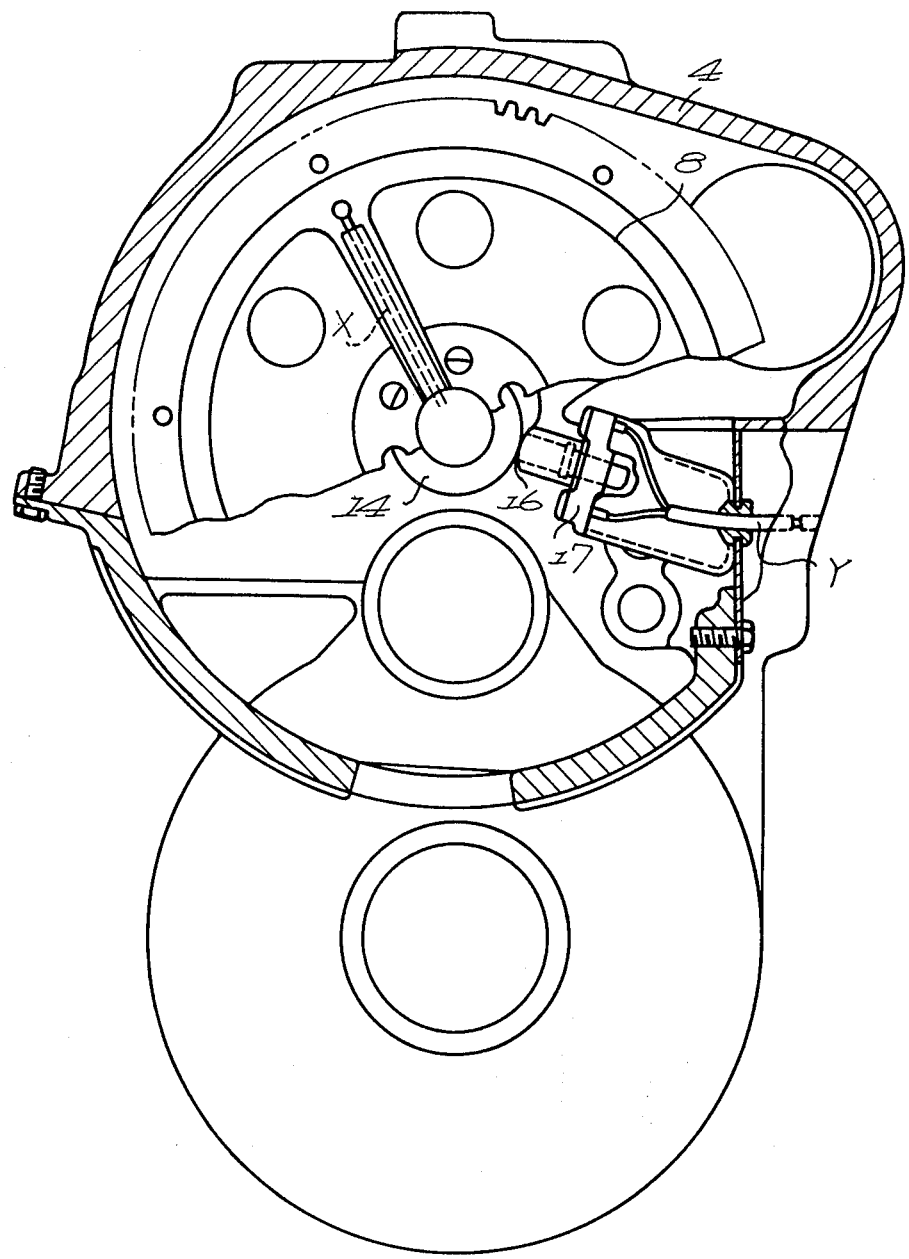
FIG. 2 is a sectional view taken along the line II—II in FIG. 1.

Referring to FIGS. 1 and 2 showing a transmission to which the present invention is applied, is an electromagnetic powder clutch 1 is operatively connected to a four-speed transmission 2 which in turn is operatively connected to a final reduction device 3.

The electro-magnetic powder clutch 1 is provided in a clutch case and comprises a drive plate 6 attached to the end of a crankshaft 5 of an internal combustion engine, an annular drive member 8 secured to the drive plate 6, a magnetizing coil 7 provided in the drive member 8, and a driven member 10 secured by a spline engagement to an input shaft 9 of the transmission 2, leaving a gap 11 from the drive member 8. Powder of magnetic material is provided in a powder chamber 12 and the gap 11 is adapted to be filled with the powder. A cap 13 is secured to the drive member 8. The cap 13 has a cylindrical portion coaxial with the input shaft 9, to which slip rings 14 are secured. The slip rings 14 are connected to the drive member 8 by a lead X. Brushes 16 (FIG. 2) press against the slip rings 14 and are supported in a holder 17 and connected to a hereinafter described control means by a lead Y.

In such a construction, the drive plate 6 and the drive member 8 rotate together with the crankshaft 5 and the magnetic powder which has been sealed into the powder chamber 12 is drawn to the inner surface of the drive member 8 by centrifugal force. If the magnetizing coil 7 is excited by the current applied through the lead Y, the brushes 16, the slip rings 14 and the lead X, the drive member 8 is magnetized to produce a magnetic flux passing through the driven member 10 as shown by arrows in FIG. 1. Thus, the powder aggregates in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, respectively. Driven gears 23 to 26 are rotatably mounted on the output shaft 22 parallel to the input shaft 9. Each of the driven gears 23 and 24 is adapted to be engaged with the output shaft 22 by operating a synchromesh mechanism 27 and each of driven gears 25 and 26 is engageable with the output shaft 22 by a synchromesh mechanism 28 in a well known manner. Further, a reverse drive gear means 29 is provided. Thus, by operating a shift lever S (FIG. 3) of the transmission, the driven gear 23 is coupled integrally with the output shaft 22 by the synchromesh mechanism 27 and the 1st speed is obtained on the output shaft 22 because the power of output shaft 9 is greatly decreased, and the 2nd, 3rd and 4th speed may be respectively obtained accordingly.

Further, provided on an end of the output shaft 22 is an output gear 30 which engages with a ring gear 32 in a differential 31 of the final reduction device 3 to transmit the output of the output shaft 22 directly from the ring gear 32 to a side gear 36 through a case 33, a spider 34 and a pinion 35, and further to driving wheels of a vehicle through a wheel shaft 37.

Figure 3:
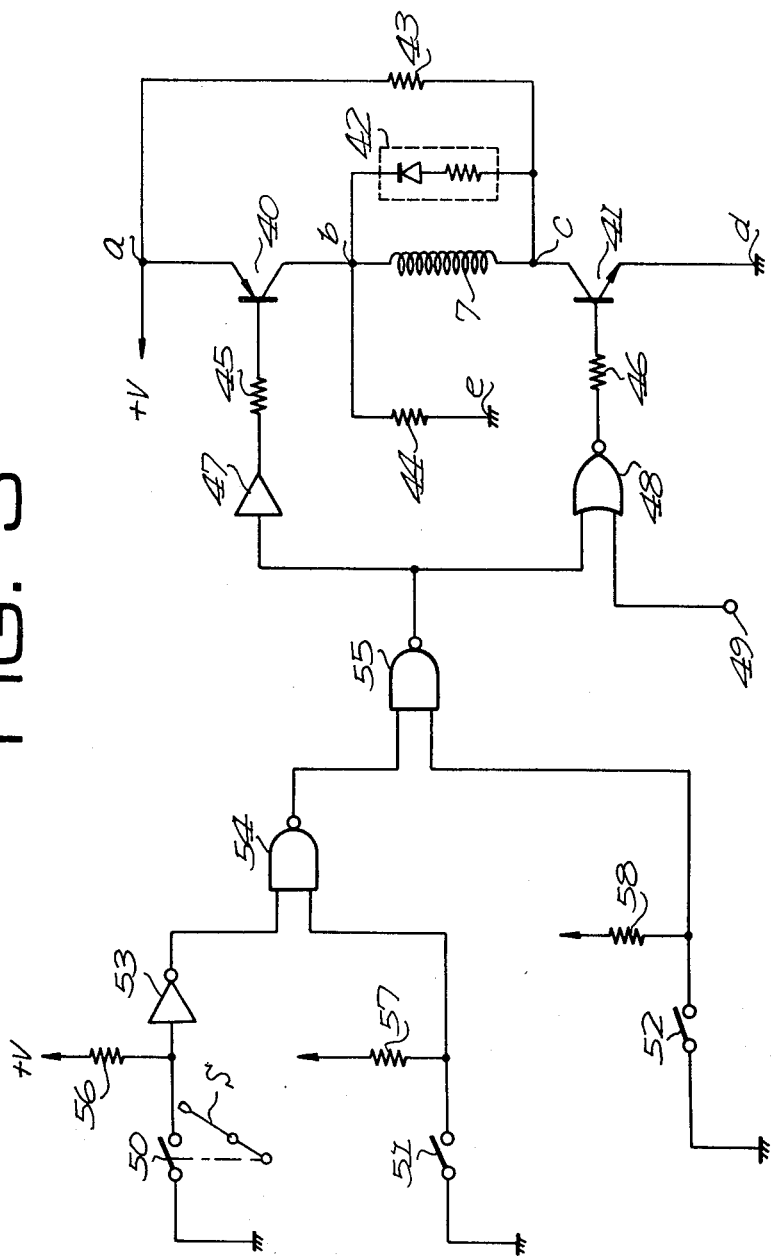
FIG. 3 is a circuit showing an example of the system of the present invention.

FIG. 3 shows an arrangement of the control circuit, in which a transistor 40 of a PNP type and a transistor 41 of an NPN type are connected respectively to opposite ends of the magnetizing coil 7. An emitter of the transistor 40 is connected to an electric source, while an emitter of the transistor 41 is grounded. A commutation circuit 42 comprises a diode and a resistor and is connected to both ends of the coil 7. A resistor 43 for inverted current is connected to the electric source and the collector of the transistor 41, and a resistor 44 for inverted current is connected between the collector of the transistor 40 and ground. The bases of the transistors 40, 41 are connected to resistors 45, 46, respectively. The resistor 45 is connected to a NAND gate 55 through a buffer 47 and the resistor 46 is connected to the NAND gate 55 through a NOR gate 48, while a clutch control signal is applied to the other input 49 of the NOR gate 48. The input 49 is at a high level during the operation of the shift lever S. A neutral switch 50 is on when the shift lever of the transmission 2 is in the neutral position, a car-speed switch 51 is on when the vehicle or car is driven faster than a predetermined speed, and a shift lever switch 52 provided on the shift lever, is on during the operation of the shift lever. One end of each switch 50, 51 and 52 is connected to ground, while the other end of the neutral switch 50 is connected to a NAND gate 54 through an inverter 53, the other end of the car speed switch 51 is to the NAND gate 54, and the other end of the shift lever switch 52 is connected to one input of the NAND gate 55. The output of the NAND gate 54 is also connected to another input of the NAND gate 55. Positive electric potential is applied to the other ends of switches 50, 51 and 52 through resistors 56, 57 and 58, respectively.

Operation of the system according to the present invention will be explained hereinafter.

When the car speed is lower than a predetermined speed, the car speed switch 51 is turned off. A high level voltage is applied to the NAND gate 54, the output of which is a high or a low level depending on the on or off condition of the neutral switch 50. When the shift lever is in the neutral position, the switch 50 is on. Thus, the output of the NAND gate 54 is at a low level and the output of the NAND gate 55 is at a high level irrespective of the condition of the switch 52. The high level output of the NAND gate 55 causes the transistor 40 to turn off and the output of the NOR gate 48 goes to a low level irrespective of the input 49. As a result the transistor 41 is also turned off. Thus, electric current flows in the order of a→c→b→e, and accordingly, the inverted current flows through the coil 7. Therefore, the residual magnetism is eliminated in the clutch, which permits a quick synchronizing and a smooth and easy operation of the shift lever.

When the shift lever is in one of the gear engaging positions, the switch 52 and 50 are opened. Consequently, the output of the NAND gate 55 changes to a low level. Thus, the transistors 40 and 41 are turned on, so that the excitation current flows in a normal direction a to b to c to d through the coil 7 to engage the clutch.

When the vehicle speed is higher than the predetermined speed, the switch 51 is closed. Thus, the output of the NAND gate 54 remains at a high level.

When the shift lever being shifted to the neutral position, the shift-lever switch 52 is turned on during the operation of the shift lever. A low level voltage is applied to the NAND gate 55 and the output of the NAND gate 55 goes to a high level. Therefore the transistors 40 and 41 are turned off, and thus, the inverted current flows through the coil 7 in the order of a→c→b→e.

When the shift lever stops in the neutral position, the shift lever switch 52 is opened, and the neutral switch 50 is closed, so that the NAND gate 55 produces a low level signal. Thus, transistors 40 and 41 are turned on, causing the exciting current to flow normally through the coil 7 from b to c. Therefore, the double clutch operation may be performed. When the shift lever S is being shifted from the neutral position to the gear engaging position, the switch 52 is turned or closed during the operation as described above with respect to shifting to neutral. Thus, the inverted current flows through the coil 7. When the shift lever reaches the gear engaging position, the shift lever switch 52 is opened. Thus, a high level voltage is applied to the NAND gate 55, so that the output of the NAND gate 55 changes to a low level. Accordingly, the excitation current flows through the coil 7 to engage the clutch.

Figure 4:
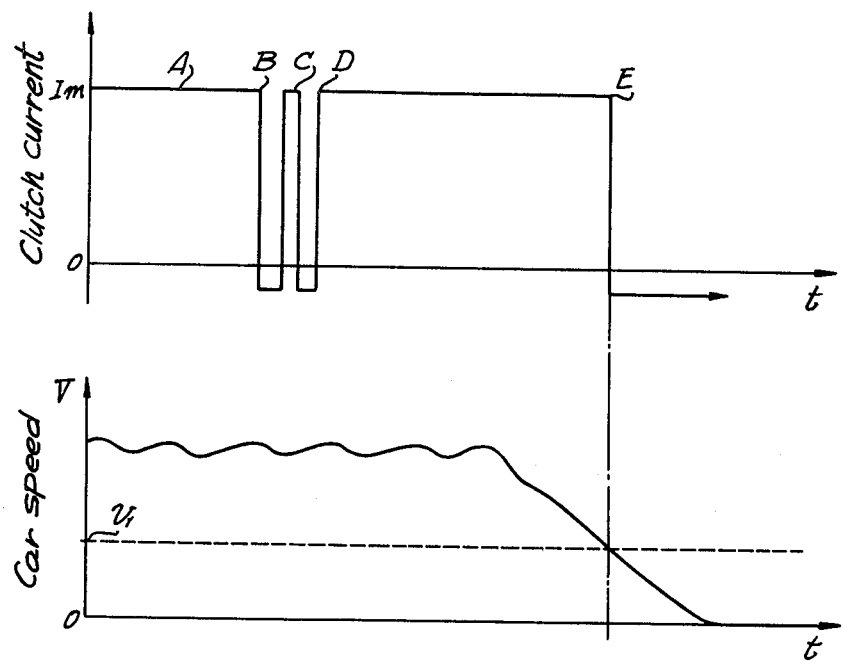
FIG. 4 is a graph showing relations between engine speed and clutch current.

In FIG. 4 showing relations between the clutch current and the car speed line A indicates that when car speed is more than a predetermined value $V_1$ and the transmission is not operated, the excitation current Im flows and the clutch is in engaging condition. If the shift lever switch 52 is turned on during shifting after B, inverted current flows temporarily, and if the shift lever switch 52 is turned off when the shift lever reaches the neutral position, the excitation current for a double clutch C action flows temporarily. When the transmission operation is finished at D and the shift lever switch 52 is turned off, the excitation clutch current flows to engage the clutch. Further, E shows a condition when the car speed is lowered below the predetermined speed $V_1$ and the neutral switch 50 or the shift lever switch 52 is on, whereby the inverted current flows as shown.

Figure 5:
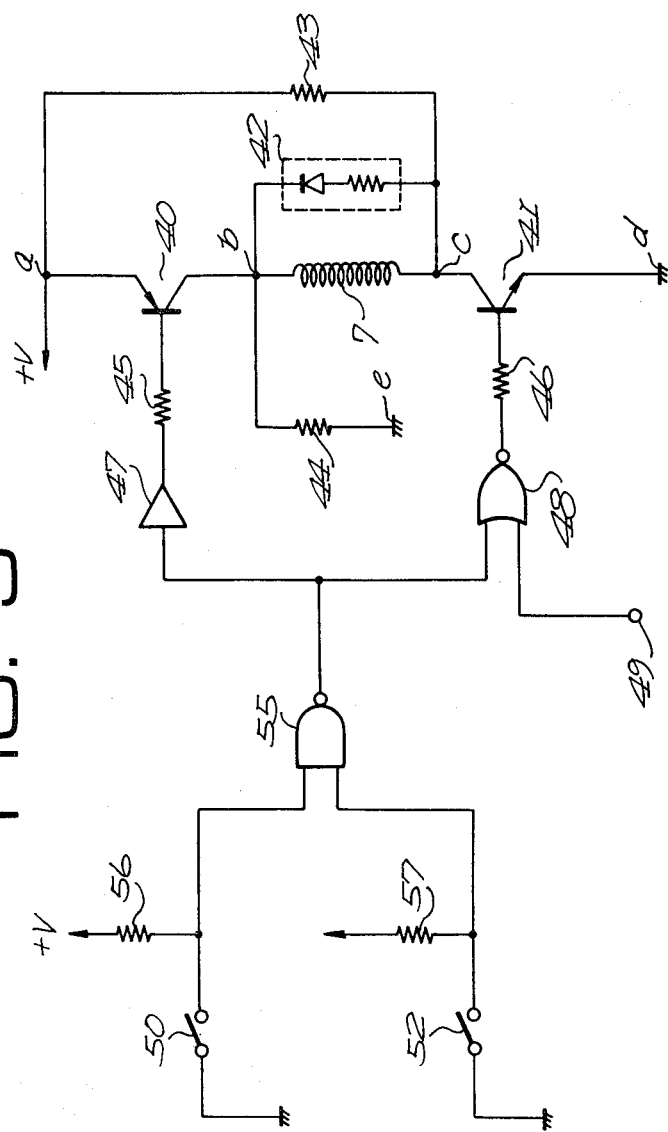
FIG. 5 is a circuit showing another embodiment of the present invention.

Referring to FIG. 5 showing the second embodiment of the present invention, here the system is not provided with the car speed switch of the first embodiment. Other parts of the system are the same as the first embodiment. Therefore, the same parts as that of FIG. 3 are identified by the same references.

When the shift lever is in the neutral position, the neutral switch 50 is closed, and a low level signal is applied to the NAND gate 55. Thus, regardless of the on-off condition of the shift lever switch 52, the output of the NAND gate 55 is at a high level. Therefore, transistors 40 and 41 are turned off, which causes the inverted current to flow in the order of a→c→b→e.

When the shift lever is operated, the shift lever switch 52 is closed and the NAND gate 55 is applied with a low level signal. Thus, regardless of the on-off condition of the neutral switch 50, the output of the NAND gate 55 is at a high level signal, so as to turn off the transistors 40 and 41. Thus, the inverted current required for eliminating the residual magnetism flows through the coil 7.

When the shift lever is in a position to engage the gears, the shift lever switch 52 is opened. The output of the NAND gate 55 goes to a low level. Thus, the transistors 40 and 41 are turned on causing the excitation current to flow through the coil 7.

Figure 6:
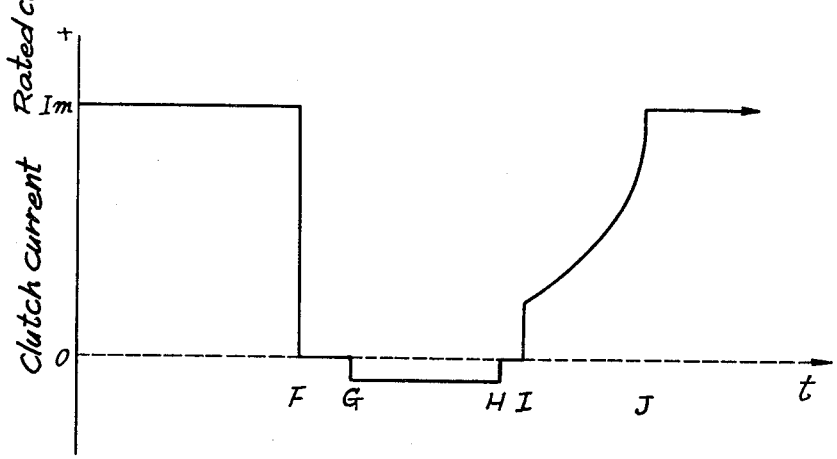
FIG. 6 is a graph showing variation of clutch current.

The variation of the clutch current in the system of the second embodiment is shown in FIG. 6. In this figure, the rated clutch current (Im) is interrupted by the input 49 of the clutch control signal between points F and G. At the point G, the neutral switch 50 or shift lever switch 52 is closed, and the inverted current flows until the neutral switch 50 or the shift lever switch 52 is turned off at the point H. At the completion of engagement of the transmission 2, the input 49 of the clutch control signal goes to a low level, the transistor 41 is turned on to flow positive current through the coil 7 in the normal or positive direction. Between points I and J, a desirable torque character can be obtained.

In accordance with the present invention, since the inverted current flows through the magnetizing coil when the shift lever of the transmission is in the neutral position, the residual magnetism is eliminated. Thus, the shift lever can be lightly and smoothly operated.

We claim:

1. In a system for controlling an electro-magnetic clutch of an internal combustion engine mounted on a vehicle, which has a drive member secured to a crankshaft of said internal combustion engine, a driven member adjacent said drive member, a transmission secured to said driven member and having multi-stage change gears and a shift lever therefor, a magnetizing coil provided in one of said members, and an electric circuit means including said magnetizing coil which is capable of passing excitation current through said magnetizing coil in a normal direction, the improvement comprising
    shift lever switch means for producing an output signal having one logic level during a shifting operation of the shift lever of said transmission,
    a neutral switch means for producing an output signal having one logic level in a neutral position of the shift lever,
    logic circuit means responsive to said output signals of said shift lever switch means and said neutral switch means for providing an output signal having logic levels,
    said electric circuit means being responsive to said output signal of said logic circuit means for controlling the current flowing through said magnetizing coil,
    said electric circuit means being so arranged that the current flows through said magnetizing coil with inverted polarity when the output signal from said logic circuit means has one logic level in the neutral position of said shift lever and that the excitation current flows through said magnetizing coil in said normal direction when the output signal of said logic circuit means has another logic level in response to opening of said shift lever switch means in an engaged condition of the change gears respectively and respectively closing of the neutral switch means when vehicle speed is greater than a predetermined speed for causing a double clutch operation,
    a car speed detecting means for providing an output signal in a low speed range lower than said predetermined speed, and
    said electric circuit means is so arranged that the current flows through said coil with the inverted polarity when the output signal of said car speed detecting means occurs in said low speed range and said shift lever is in said neutral position, and respectively during the shifting operation of said shift lever.

2. In a system for controlling an electro-magnetic clutch of an internal combustion engine mounted on a vehicle, which has a drive member secured to a crankshaft of said internal combustion engine, a drive member adjacent said drive member, a transmission secured to said driven member and having multi-stage change gears and a shift lever therefor, a magnetizing coil provided in one of said members, and an electric circuit means including said magnetizing coil which is capable of passing excitation current through said magnetizing coil in a normal direction, the improvement comprising
    shift lever switch means for producing an output signal having one logic level during a shifting operation of the shift lever of said transmission,
    a neutral switch means for producing an output signal having one logic level in a neutral position of the shift lever,
    logic circuit means responsive to said output signals of said shift lever switch means and said neutral switch means for providing an output signal having logic levels,
    said electric circuit means being responsive to said output signal of said logic circuit means for controlling the current flowing through said magnetizing coil,
    said electric circuit means being so arranged that the current flows through said magnetizing coil with inverted polarity when the output signal from said logic circuit means has one logic level in the neutral position of said shift lever and that the excitation current flows through said magnetizing coil in said normal direction when the output signal of said logic circuit means has another logic level in response to opening of said shift lever switch means in an engaged condition of the change gears respectively and respectively closing of the neutral switch means when vehicle speed is greater than a predetermined speed for causing a double clutch operation, and said electric circuit means includes a pair of transistors with collector-emitter paths in series with said magnetizing coil therebetween.

3. The system for controlling an electro-magnetic clutch of an internal combustion engine according to claim 1, wherein said logic circuit means comprises a first NAND gate having a first input operatively connected to said neutral switch means and another input connected to said shift lever switch means.

4. The system for controlling an electro-magnetic clutch of an internal combustion engine according to claim 3, wherein said logic circuit means further comprises a second NAND gate having an input connected to said neutral switch means, an output connected to said first input of said first NAND gate, and another input connected to said car speed detecting means.

5. The system for controlling an electro-magnetic clutch of an internal combustion engine according to claim 4, further wherein said logic circuit means further comprises a NOR gate having an input connected to the output of said first NAND gate and another input receiving a clutch control signal having one logic level when the shift lever is moving.

6. The system for controlling an electro-magnetic clutch of an internal combustion engine according to claim 4, further wherein said electric circuit means includes a pair of transistors with collector-emitter paths in series with said magnetizing coil therebetween, one of said transistors is a NPN transistor and the other of said transistors is a PNP transistor, a base of one of said transistors is connected to the output of said NOR gate and a base of another of said transistors is connected to the output of said first NAND gate.

7. The system for controlling an electro-magnetic clutch of an internal combustion engine according to claim 6, further wherein said electric circuit means further comprises a commutation circuit having a first resistor and a diode in series and together connected in parallel to said magnetizing coil, a second resistor is connected at one end to a junction of said commutation circuit and one end of said magnetizing coil, a third resistor is connected at one end thereof to another end of said magnetizing coil, said one ends of said second and third resistors and said collector-emitter paths of said transistors are connected across voltage.

8. In a system for controlling an electro-magnetic clutch of an internal combustion engine mounted on a vehicle, which has a drive member secured to a crankshaft of said internal combustion engine, a driven member adjacent said drive member, a transmission secured to said driven member and having multi-stage change gears and a shift lever therefor, a magnetizing coil provided in at least one of said members, and an electric circuit means including said magnetizing coil which is capable of passing excitation current through said magnetizing coil in a normal direction, the improvement comprising means for detecting a movement of shifting of the shift lever, said electric circuit means for passing current through the magnetizing coil, during shifting of the shift lever, in an inverted direction relative to said normal direction, a neutral switch means for producing logic levels, with one of said logic levels occurring in a neutral position of the shift lever, said detecting means comprises a shift lever switch means for producing logic levels, with one of said logic levels occurring upon a predetermined path of movement of shifting of said shift lever, said electric circuit means comprises a NAND gate having a first input operatively connected to said neutral switch means and another input connected to said shift lever switch means, said electric circuit means further comprises a NOR gate having an input connected to the output of said NAND gate and another input receiving a clutch control signal having one logic level when the shift lever is moving, said electric circuit means further includes a pair of transistors with collector-emitter paths in series with said magnetizing coil therebetween, a base of one of said transistors is connected to the output of said NOR gate and a base of another of said transistors is connected to the output of said NAND gate, and said electric circuit means further comprises a commutation circuit having a first resistor and a diode in series and together connected in parallel to said magnetizing coil, a second resistor is connected at one end to a junction of said commutation circuit and one end of said magnetizing coil, a third resistor is connected at one end thereof to another end of said magnetizing coil, said one ends of said second and third resistors and said collector-emitter paths of said transistors are connected across voltage.

9. The system for controlling an electro-magnetic clutch of an internal combustion engine according to claim 8, wherein said predetermined path of movement of shifting of said shift lever is less than the entire path of the movement of shifting of said shift lever, whereby said clutch control signal has its said one logic level without said shift lever switch means producing its said one logic level at positions of the movement of shifting of said shift lever outside of said predetermined path of movement of shifting of said shift lever, said electric circuit means being arranged such that only said transistor which is directly connected to said junction is on when said clutch control signal has its said one logic level without said shift lever switch means producing its said one logic level at the positions of the movement of shifting of said shift lever outside of said predetermined path of movement of shifting of said shift lever whereby zero current flows through said magnetizing coil.

10. The system for controlling an electro-magnetic clutch of an internal combustion engine according to claim 9, wherein said predetermined path of movement of shifting of said shift lever is exclusively at a central position of the path of movement of said shift lever.

11. In a system for controlling an electro-magnetic clutch of an internal combustion engine mounted on a vehicle, which has a drive member secured to a crankshaft of said internal combustion engine, a driven member adjacent said drive member, a transmission secured to said driven member and having multi-stage change gears and a shift lever therefor, a magnetizing coil provided in one of said members, and an electric circuit means including said magnetizing coil which is capable of passing excitation current through said magnetizing coil in a normal direction, the improvement comprising shift lever switch means in a first condition thereof for producing an output signal having one logic level during operation of the shift lever of said transmission, said shift lever switch means having a second condition for producing an output signal having another logic level when the shift lever of said transmission is not operated, a neutral switch means for producing an output signal having one logic level in a neutral position of the shift lever, a car speed detecting means for producing one output signal when the vehicle speed is in a low speed range lower than said predetermined speed and another output signal when the vehicle speed is in a high speed range higher than said predetermined speed, and logic circuit means responsive to said output signals of said shift lever switch means, said neutral switch means, and said car speed detecting means for providing an output signal having logic levels, said electric circuit means being responsive to said output signal of said logic circuit means for controlling the current flowing through said magnetizing coil, said electric circuit means being so arranged that the current flows through said magnetizing coil with inverted polarity when the output signal from said logic circuit means has one logic level in the neutral position of said shift lever when said one output signal of said car speed detecting means occurs in said low speed range, and respectively during operation of said shift lever, respectively that the excitation current flows through said magnetizing coil in said normal direction when the output signal of said logic circuit means has another logic level in response to the second condition of said shift lever switch means in the neutral position of said shift lever when the vehicle speed is greater than said predetermined speed for causing a double clutch operation.

12. The system according to claim 11, wherein said shift lever switch means is provided on the shift lever, is opened in said second condition and closed in said first condition thereof.

* * * * *